(12) United States Patent
Sudou

(10) Patent No.: US 9,557,816 B2
(45) Date of Patent: Jan. 31, 2017

(54) INPUT DEVICE

(75) Inventor: Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 191 days.

(21) Appl. No.: 13/984,210

(22) PCT Filed: Feb. 10, 2012

(86) PCT No.: PCT/JP2012/000910
§ 371 (c)(1),
(2), (4) Date: Aug. 7, 2013

(87) PCT Pub. No.: WO2012/108214
PCT Pub. Date: Aug. 16, 2012

(65) Prior Publication Data
US 2013/0314359 A1    Nov. 28, 2013

(30) Foreign Application Priority Data
Feb. 10, 2011    (JP) .................. 2011-027432

(51) Int. Cl.
| | | |
|---|---|---|
| G06F 3/041 | (2006.01) | |
| G09G 5/00 | (2006.01) | |
| G06F 3/01 | (2006.01) | |
| G06F 3/0488 | (2013.01) | |
| H04M 1/2745 | (2006.01) | |

(52) U.S. Cl.
CPC ............ *G06F 3/016* (2013.01); *G06F 3/0488* (2013.01); *H04M 1/2745* (2013.01); *H04M 2250/22* (2013.01)

(58) Field of Classification Search
CPC .. G06F 3/016; G06F 2203/014; G06F 3/0488; H01H 13/85; G09B 21/001; G09B 21/003; H04M 1/2745; H04M 2250/22

USPC .................................................. 345/156–178
See application file for complete search history.

(56) References Cited

U.S. PATENT DOCUMENTS

| | | | |
|---|---|---|---|
| 2003/0122779 A1* | 7/2003 | Martin et al. ................. | 345/156 |
| 2009/0106655 A1* | 4/2009 | Grant et al. .................. | 715/702 |
| 2010/0017710 A1* | 1/2010 | Kim et al. .................... | 715/702 |
| 2011/0084921 A1* | 4/2011 | Kang et al. ................... | 345/173 |

FOREIGN PATENT DOCUMENTS

JP    11-355417 A    12/1999

OTHER PUBLICATIONS

International Search Report; PCT/JP2012/000910; Mar. 13, 2012.

* cited by examiner

*Primary Examiner* — Amit Chatly
(74) *Attorney, Agent, or Firm* — Studebaker & Brackett PC

(57) ABSTRACT

To support a non-display setting for each piece of data corresponding to a display item, and to easily allow the user to recognize the existence of data set to a secret setting, the input device (101) according to the present invention includes a touch sensor (104) that detects contact, a display unit (103), a tactile sensation providing unit (107) that provides a tactile sensation to a contacting object in contact with the touch sensor (104), and a control unit (108) that controls the tactile sensation providing unit (107) to provide the tactile sensation to the contacting object in contact with the touch sensor (104) when, for a display item being displayed on the display unit (103), data set to the non-display setting exists in correspondence with the display item.

8 Claims, 6 Drawing Sheets

INPUT DEVICE

CROSS-REFERENCE TO RELATED APPLICATION

This application claims priority to and the benefit of Japanese Patent Application No. 2011-027432 filed Feb. 10, 2011, the entire contents of which are incorporated herein by reference.

TECHNICAL FIELD

The present invention relates to an input device and to an input device that supports a non-display setting for data.

BACKGROUND

An input device, such as a mobile phone terminal, often includes an address book application that manages the name, telephone number, email address, and the like of acquaintances (phone book application), a schedule application that manages the user's schedule, and the like. The information used by these applications includes personal information. Therefore, the user may not want some of the data registered in applications such as the address book application to be seen by a third-party (other person).

Out of consideration for such circumstances, some conventional mobile phone terminals support a non-display setting (secret setting) that does not display registered data (for example, see Patent Literature 1). In the mobile phone terminal disclosed in Patent Literature 1, a secret setting can be set for each piece of data in the address book, and an item set to the secret setting is not displayed in the address book. In order to cancel the secret setting, the user inputs a security code on the standby screen. When the security code is correct, the secret setting is temporarily canceled, and the user can visually confirm data set to the secret setting in the address book.

CITATION LIST

Patent Literature 1: JP11355417A

SUMMARY

In such an input device, however, that the user cannot confirm whether data set to the secret setting exists or not until canceling the secret setting, a user who has forgotten about the existence of data set to the secret setting might re-register data that is not being displayed due to the secret setting. Moreover, even if data has not yet been registered, the user might mistakenly think that the data is not being displayed due to the secret setting and look for the data after canceling the secret setting. These operations are annoying for the user, and this issue becomes more pronounced as the secret setting is set for an increasing amount of data.

Accordingly, the present invention has been conceived in light of the above considerations, and is to provide an input device that easily allows the user to recognize the existence of data set to the secret setting.

In order to achieve the above matter, an input device according to a first aspect of the present invention includes: a touch sensor configured to detect contact; a display unit; a tactile sensation providing unit configured to provide a tactile sensation to a contacting object in contact with the touch sensor; and a control unit configured to set a non-display setting for each piece of data corresponding to a display item, and to control the tactile sensation providing unit to provide the tactile sensation to the contacting object in contact with the touch sensor when, for a display item being displayed on the display unit, data set to the non-display setting exists in correspondence with the display item.

The input device preferably further includes a pressure detection unit configured to detect pressure on the touch sensor, such that when, for the display item being displayed on the display unit, data set to the non-display setting exists in correspondence with the display item, and a value based on pressure on the touch sensor is equal to or greater than a threshold, the control unit controls the tactile sensation providing unit to provide the tactile sensation to the contacting object in contact with the touch sensor.

When a plurality of types of non-display settings exist for data corresponding to the display item, the control unit preferably sets a plurality of thresholds corresponding to the types of the non-display settings.

After the tactile sensation providing unit provides the tactile sensation, when the touch sensor detects contact satisfying a predetermined trajectory condition, the control unit preferably cancels the non-display setting for the data set to the non-display setting and controls the display unit to display the data set to the non-display setting.

When the touch sensor detects new contact satisfying a predetermined condition after the control unit cancels the non-display setting for the data set to the non-display setting, the control unit preferably controls the display unit to resume non-display of the data for which the non-display setting was canceled.

When a plurality of pieces of data set to the non-display setting exists, the control unit preferably controls the tactile sensation providing unit to change a number of times the tactile sensation is provided to the contacting object in accordance with a number of pieces of data that are set to the non-display setting and that correspond to the display item displayed on the display unit.

When a position of the contact detected by the touch sensor is a predetermined position, the control unit preferably controls the tactile sensation providing unit to provide the tactile sensation to the contacting object in contact with the touch sensor.

When a first data group including data set to the non-display setting and a second data group not including data set to the non-display setting exist, and first identification information corresponding to the first data group and second identification information corresponding to the second data group are displayed on the display unit, the control unit preferably controls the tactile sensation providing unit to provide the tactile sensation to the contacting object in contact with the touch sensor when a position of the contact detected by the touch sensor is a position at which the first identification information is being displayed and not to provide the tactile sensation to the contacting object when the position of the contact is a position at which the second identification information is being displayed.

When the first data group includes data not set to the non-display setting and the touch sensor detects contact to the data not set to the non-display setting, the control unit preferably controls the display unit to display detailed information for the data not set to the non-display setting.

According to the present invention, the input device with the above structure provides a tactile sensation to a contacting object in contact with the touch sensor when data set to the non-display setting exists in correspondence with a display item. Therefore, in accordance with whether a tactile sensation is provided, the user can easily recognize the existence of data set to the non-display setting.

BRIEF DESCRIPTION OF DRAWINGS

The present invention will be further described below with reference to the accompanying drawings, wherein.

DESCRIPTION OF EMBODIMENTS

With reference to the drawings, the following describes an embodiment of the present invention.

Figure 1:
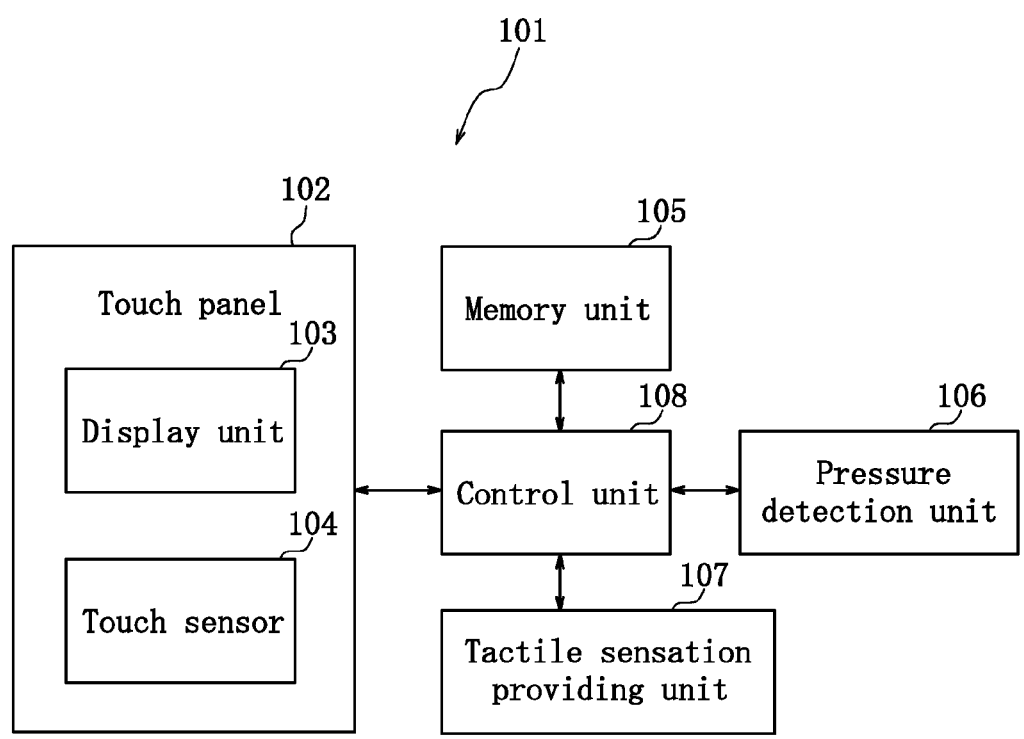
FIG. 1 is a functional block diagram schematically illustrating the configuration of an input device according to an embodiment of the present invention.

FIG. 1 is a functional block diagram schematically illustrating the configuration of an input device according to an embodiment of the present invention. Examples of an input device 101 according to the present invention include a mobile phone terminal, a Personal Digital Assistant (PDA), a portable music player, a portable television, a portable game device, a bank Automated Teller Machine (ATM), and a station ticket vending machine. This input device 101 supports a non-display setting (secret setting) for each piece of data. An application on the input device 101, which enhances usability for the user by supporting the non-display setting, is for example an application that handles personal information, such as an address book application, an email application, a schedule application, a task list (To Do list) application, a bookmark application, or a notepad application.

The input device 101 includes a touch panel 102, a memory unit 105, a pressure detection unit 106, a tactile sensation providing unit 107, and a control unit 108. The touch panel 102 is provided with a display unit 103 and a touch sensor 104.

Figure 2:
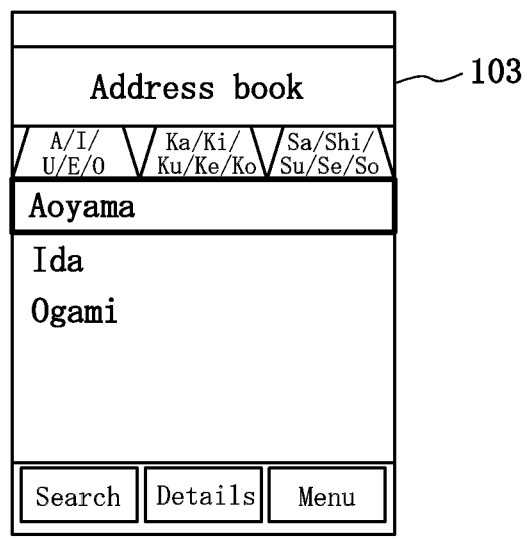
FIG. 2 is an example of a display screen of the display unit in FIG. 1.
Figure 3:
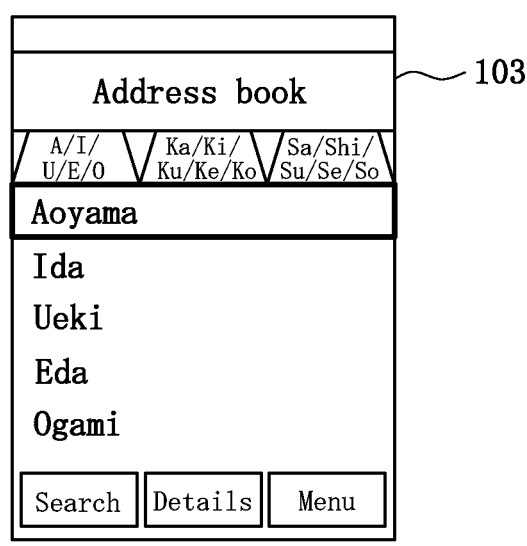
FIG. 3 is an example of a display screen of the display unit in FIG. 1.

The display unit 103 executes display corresponding to an application provided on the input device 101. The display unit 103 is, for example, configured using a liquid crystal display panel, an organic EL display panel, or the like. When an address book application is being executed as an application on the input device 101, the display unit 103 for example displays a list of names registered in an address book, as shown in FIG. 2. In FIG. 2, a list of names registered under the A row (A/I/U/E/O) in the address book is displayed. Hereinafter, the content displayed by the display unit 103 is referred to as a "display item". In other words, in FIG. 2, the display item is "the A row of the address book". Any elements constituting the display item are the "data" corresponding to the display item. The target of the non-display setting is each piece of data corresponding to the display item. Data not set to the non-display setting is displayed on the display unit 103. In other words, in FIG. 2, the pieces of data not set to the non-display setting are "Aoyama", "Ida" and "Ogami". When the non-display setting is set for every piece of data corresponding to the display item, the data is not displayed on the display unit 103. The data set to the non-display setting (non-display setting data) is displayed on the display unit 103 when the non-display setting is canceled. For example, when the non-display setting is set for the pieces of data "Ueki" and "Eda", the display on the display unit 103 becomes as illustrated in FIG. 3 upon cancellation of the non-display setting. Hereinafter, a collection of pieces of data in the same category (group) is referred to as a "data group". For example, the data group for the A row refers to a collection of data having pieces of data not set to the non-display setting, i.e. "Aoyama", "Ida" and "Ogami", and pieces of data set to the non-display setting, i.e. "Ueki" and "Eda". Furthermore, information that indicates common attributes among data in a data group is referred to as "identification information". In FIG. 2, the identification information of the data group for the A row is displayed as the tab for the A row (the region showing "A/I/U/E/O" in FIG. 2).

The display unit 103 can also display a key or button for input of a character. When the display unit 103 displays a key or button, the input device 101 need not be provided with a mechanical key or button for input of a character.

The touch sensor 104 detects contact by the user's finger, a stylus pen, or the like (contacting object) and is configured using a well-known type, such as a resistive film type, a capacitive type, an optical type, or the like. Upon detecting contact, the touch sensor 104 transmits contact position information on the position of the contact to the control unit 108. Note that in order for the touch sensor 104 to detect contact, it is not essential for the contacting object to physically contact the touch sensor 104. For example, if the touch sensor 104 is an optical type, the touch sensor 104 detects the position at which an infrared ray on the touch sensor 104 is blocked by a finger, a stylus pen, or the like, and therefore the contacting object need not contact the touch sensor 104. Note that pressure is not limited to a push with a pressing force, but also includes the case of a user's finger, a stylus pen, or the like contacting the touch sensor 104 with a pressing force of zero or next to zero.

The memory unit 105 stores a variety of information related to contact (for example, contact position information), a pressure condition, a position condition and a predetermined trajectory condition on the touch panel 102, and the like. The memory unit 105 also functions as a work memory and the like. The pressure condition is a standard for the tactile sensation providing unit 107 to provide a tactile sensation indicating the existence of non-display setting data, for example such as data based on pressure on the touch sensor 104 being equal to or greater than a threshold related to pressure.

The position condition is a standard for the tactile sensation providing unit 107 to provide a tactile sensation indicating the existence of non-display setting data, for example such as the contact position on the touch sensor 104 being a predetermined position. It should be understood that contact to a predetermined position is not limited strictly to contact to that position, but rather includes, for example, contact that traverses a predetermined position due to a slide operation to slide the contacting object (drag operation). The slide operation refers to an operation to move the contact position while contact is maintained.

Furthermore, the predetermined trajectory condition is a standard for the control unit 108 to cancel the non-display setting, for example such as the contact trajectory of a slide operation by the contacting object matching a predetermined trajectory. When contact satisfying the predetermined trajectory condition is detected, the non-display setting is canceled. Note that the contact trajectory matching a predetermined trajectory is not limited strictly to a complete match. For example, if an error range is determined in advance and the contact trajectory is within the error range, the contact trajectory can be considered to match the predetermined trajectory.

The control unit 108 can freely set the threshold related to pressure and the predetermined trajectory. Therefore, the control unit 108 can also set a plurality of thresholds related to pressure and predetermined trajectories in accordance with a plurality of types of non-display settings of data corresponding to a display item. The types of non-display settings are classified by application supporting a non-display setting, or by attribute or degree of secrecy of data in the same application. For example, within an address book application, the control unit 108 can set the threshold related to pressure for non-display setting data belonging to a family group to be larger (or smaller) than the threshold related to pressure for non-display setting data belonging to a friend group. The control unit 108 can also set the predetermined trajectory corresponding to cancellation of the non-display setting to be a triangle within an address book application and set the predetermined trajectory corresponding to cancellation of the non-display setting to be a rectangle within a schedule book application.

The pressure detection unit 106 detects pressure on the touch sensor 104 and is, for example, configured using a strain gauge sensor, an element such as a piezoelectric element, or the like that experiences a change in physical or electrical characteristics (strain, resistance, voltage, or the like) in response to pressure. When the pressure detection unit 106 is configured using a piezoelectric element, for example, the magnitude of the voltage (voltage value), which is an electrical characteristic, of the piezoelectric element changes in accordance with the magnitude of the load (force) of the pressure on the touch sensor 104 (or the speed at which the magnitude of the load (force) changes (acceleration)). The pressure detection unit 106 notifies the control unit 108 of the magnitude of the voltage (voltage value, hereinafter referred to simply as data). The control unit 108 acquires the data by the pressure detection unit 106 notifying the control unit 108 of the data, or by the control unit 108 detecting data relating to the piezoelectric element in the pressure detection unit 106. The control unit 108 thus acquires data based on pressure on the touch sensor 104. In other words, the control unit 108 acquires data based on pressure from the pressure detection unit 106.

The tactile sensation providing unit 107 vibrates the touch sensor 104 to provide a tactile sensation to the user's finger, a stylus pen, or the like (contacting object) in contact with the touch sensor 104 and is, for example, configured using a vibrating element such as a piezoelectric element or the like. The provided tactile sensation may be any sort of vibration, and the control unit 108 can set the frequency, phase (wavelength), amplitude, and waveform appropriately in accordance with the tactile sensation to be provided. For example, the control unit 108 can set a different tactile sensation for each application supporting a non-display setting (for example, for an address book application and for a schedule application), or for each type of data (for example, for family data and for friend data). The control unit 108 can also appropriately set the number of tactile sensations provided to the contacting object. For example, the control unit 108 can set the number of tactile sensations provided to the contacting object to match the number of pieces of non-display setting data corresponding to a display item being displayed on the display unit 103.

The tactile sensation providing unit 107 can also provide the contacting object with not only a simple vibration, but also a hard tactile sensation like the click felt when pressing a mechanical key (realistic clicking sensation). By setting a condition for providing a tactile sensation (for example, the load of the pressure on the touch panel 102 exceeding 1 N (newton) (correspondingly, the data based on pressure on the touch panel 102 (voltage) exceeding 1 V)), it is possible to stimulate the user's sense of pressure until the condition is satisfied, and once the condition is satisfied, to stimulate the user's sense of touch by the tactile sensation providing unit 107 vibrating the touch sensor 104. In this way, by stimulating the user's sense of pressure and sense of touch, the user can be provided with a hard, click-like tactile sensation. The touch sensor 104 itself is not physically displaced like a mechanical key when pressed, but providing a tactile sensation as above to the touching object (contacting object) allows the user to obtain a realistic clicking sensation as when operating a mechanical key. As a result, the user can operate the touch sensor 104, which normally provides no feedback by contact, without a sense of awkwardness. A hard, click-like tactile sensation can be achieved by, for example, providing one cycle of a sine wave or one cycle of a rectangular wave at 140 Hz to 500 Hz.

When the pressure detection unit 106 and the tactile sensation providing unit 107 are both configured using a piezoelectric element, the pressure detection unit 106 and the tactile sensation providing unit 107 can be configured to share the same piezoelectric element. The reason is that a piezoelectric element generates voltage when pressure is applied and deforms upon application of voltage. Note that the tactile sensation providing unit 107 can be configured to vibrate the touch sensor 104 indirectly by causing the input device 101 to vibrate via a vibration motor (eccentric motor) or the like, or to vibrate the touch sensor 104 directly by providing a piezoelectric element in the touch sensor 104.

The control unit 108 controls and manages the entire input device 101, starting with the functional blocks thereof. The control unit 108 can be configured by software running on any suitable processor, such as a central processing unit (CPU), or by dedicated processors specific to each process (such as digital signal processors (DSP)). Processing by the control unit 108 is described below in detail with reference to FIGS. 4, 5, and 6.

Figure 4:
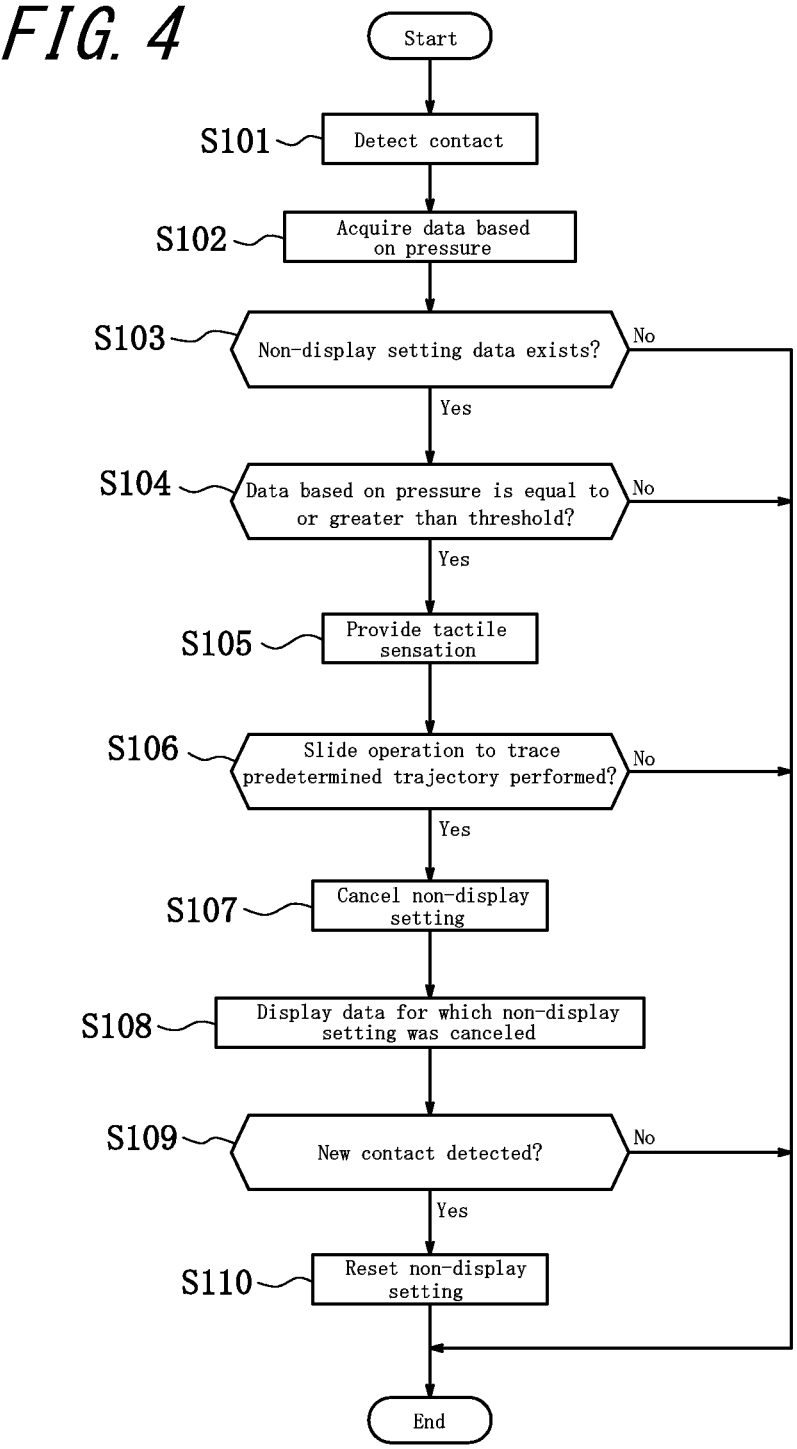
FIG. 4 is a flowchart illustrating processing by the input device in FIG. 1.
Figure 5:
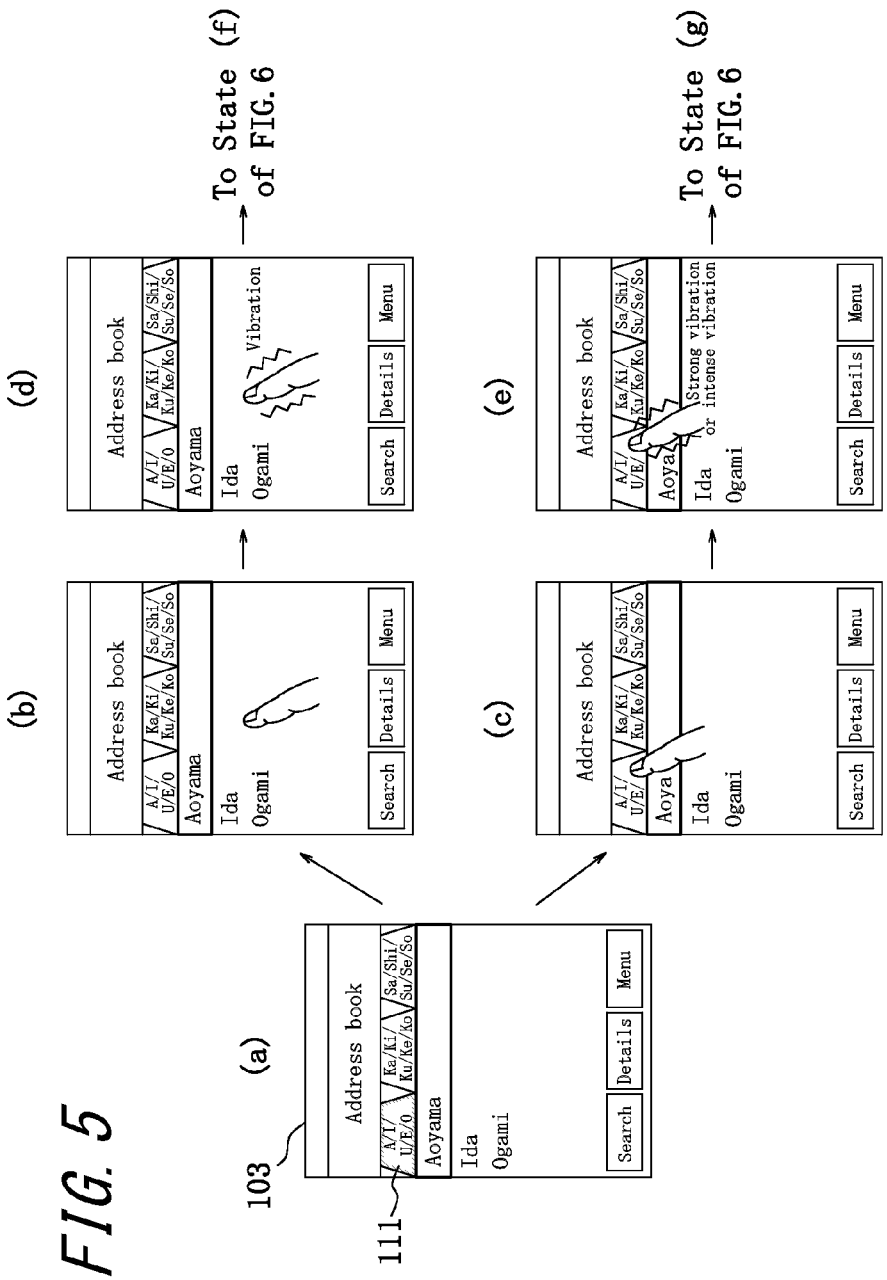
FIG. 5 graphically illustrates processing by the input device in FIG. 1.
Figure 6:
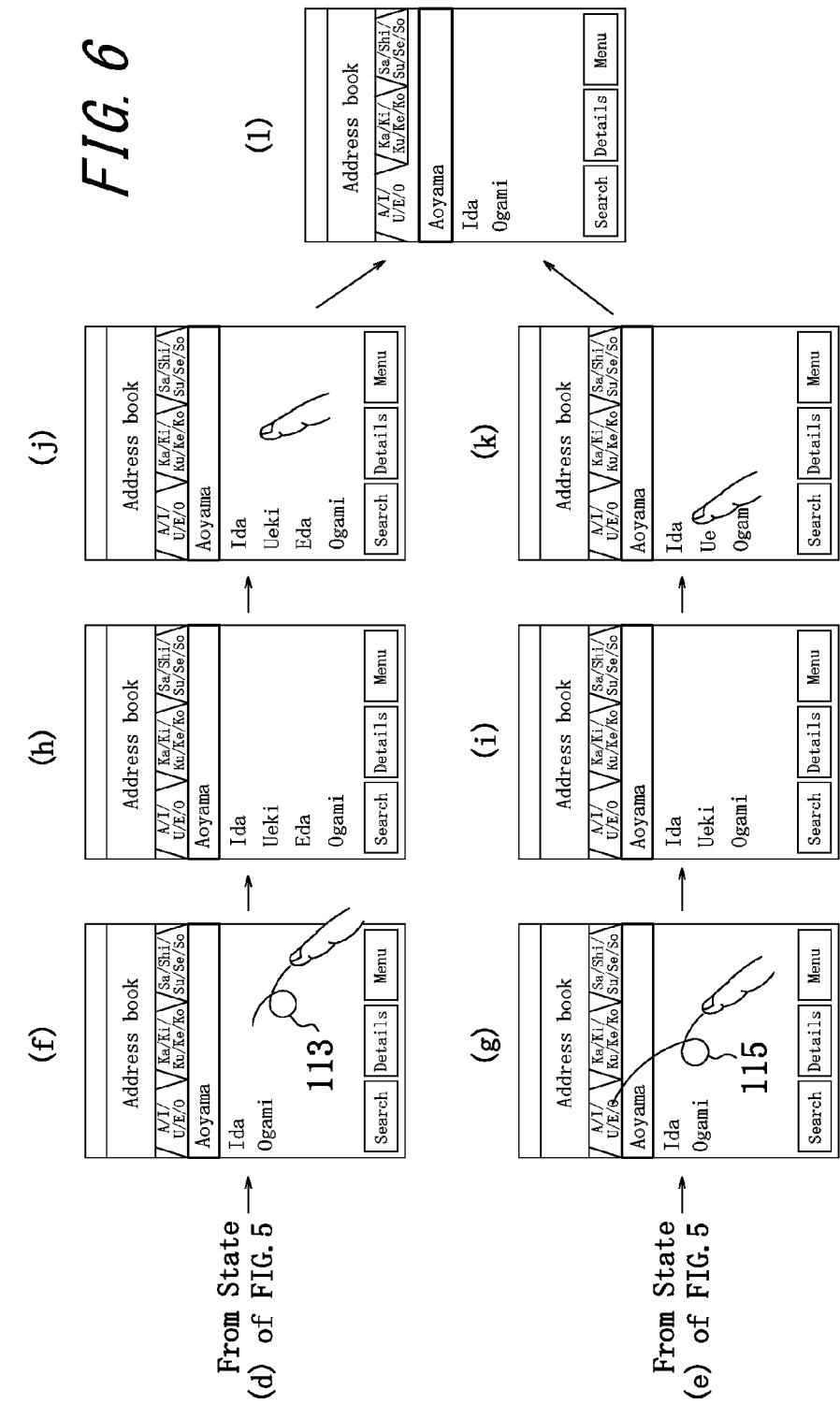
FIG. 6 graphically illustrates processing by the input device in FIG. 1.

Next, a method by which the input device 101 allows the user to recognize the existence of data set to the non-display setting (secret setting) is described with reference to FIGS. 4, 5, and 6. FIG. 4 is a flowchart illustrating processing by the input device in FIG. 1. FIGS. 5 and 6 graphically illustrate processing by the input device in FIG. 1. Hereinafter, it is assumed that "the A row of the address book" (A/I/U/E/O) as in FIG. 2 is displayed on the display unit 103 as a display item (state (a) of FIG. 5), and that the non-display setting is set for the data "Ueki" belonging to the family group and for the data "Eda" belonging to the friend group. Furthermore, in the present embodiment, it is assumed that the control unit 108 has set one threshold related to pressure for contact outside of a tab 111 (first threshold related to pressure) and has set two thresholds related to pressure for contact to the tab 111 (second and third thresholds related to pressure (second threshold related to pressure <third threshold related to pressure)). The first threshold related to pressure is a standard related to the existence of non-display setting data regardless of the type of non-display setting. The second threshold related to pressure is a standard related to the existence of non-display setting data belonging to the family group, and the third threshold related to pressure is a standard related to the existence of non-display setting data belonging to the friend group.

When a contacting object such as the user's finger, stylus pen, or the like contacts the touch panel 102 (states (b) and (c) of FIG. 5), the touch sensor 104 detects the contact (step S101).

The control unit 108 starts to acquire data based on pressure on a touch face of the touch sensor 104 from the pressure detection unit 106 at the point at which the contacting object such as the user's finger, stylus pen, or the like contacts the touch sensor 104 (step S102).

Upon the touch sensor 104 detecting contact, the control unit 108 determines whether data set to the non-display setting (non-display setting data) exists in correspondence with the current display item (step S 103). Since the touch sensor 104 transmits contact position information related to the contact to the control unit 108, the control unit 108 can also execute processing to confirm the existence of non-display setting data when contact to a predetermined position is detected. For example, when contact is detected to the tab 111 (state (c) of FIG. 5), the control unit 108 can execute processing to confirm the existence of non-display setting data. Requiring contact to a predetermined position allows for prevention of misuse by a third-party that is not aware of the position. Note that when the touch sensor 104 detects contact to data not set to the non-display setting (for example, "Aoyama"), then without executing processing to confirm the existence of non-display setting data, the control unit 108 can also cause the display unit 103 to display detailed information (telephone number, email address, postal address, and the like) on the data not set to the non-display setting ("Aoyama").

Among the data constituting the display item, when data set to the non-display setting exists (step S103: Yes), the control unit 108 can compare the data based on pressure detected by the pressure detection unit 106 with a threshold related to pressure stored in the memory unit 105 (step S104).

When the data based on pressure is equal to or greater than the threshold related to pressure (step S104: Yes), the control unit 108 can control the tactile sensation providing unit 107 to provide a tactile sensation to the contacting object in contact with the touch sensor 104 (step S105). With this tactile sensation, the user can recognize that data set to the non-display setting exists in correspondence with the current display item. Note that the control unit 108 can vary the tactile sensation in correspondence with different thresholds related to pressure. For example, the control unit 108 can set a first tactile sensation (for example, a vibration) in correspondence with the first threshold related to pressure, a second tactile sensation (for example, a strong vibration) in correspondence with the second threshold related to pressure, and a third tactile sensation (for example, an intense vibration) in correspondence with the third threshold related to pressure. In other words, by provision of the first tactile sensation, the user can recognize the existence of non-display setting data (state (d) of FIG. 5). By provision of the second tactile sensation, the user can recognize the existence of non-display setting data belonging to the family group ("Ueki") (state (e) of FIG. 5). By provision of the third tactile sensation, the user can recognize the existence of non-display setting data belonging to the friend group ("Eda") (state (e) of FIG. 5).

Furthermore, the control unit 108 can control the tactile sensation providing unit 107 to change the number of times a tactile sensation is provided in accordance with the number of pieces of data set to the non-display setting. In the present embodiment, two pieces of non-display setting data exist, "Ueki" and "Eda". Accordingly, when contact is performed with data based on pressure equal to or greater than the first threshold related to pressure, the control unit 108 can control the tactile sensation providing unit 107 to provide the first tactile sensation twice (two vibrations). As a result, the user can recognize the number of pieces of non-display setting data.

After provision of the tactile sensation, suppose that the user performs a slide operation without releasing the contacting object from the touch sensor 104 (states (f) and (g) of FIG. 6). The touch sensor 104 transmits position information for the contact by the slide operation to the control unit 108, and the control unit 108 determines whether the contact trajectory 113 or 115 obtained from the position information matches a predetermined trajectory (step S106).

When a slide operation to trace a predetermined trajectory was performed (step S106: Yes), the control unit 108 cancels the non-display setting for the data that was set to the non-display setting and that corresponds to the display item currently being displayed on the display unit 103 (step S107). The control unit 108 then causes the display unit 103 to display the data for which the non-display setting has been canceled (step S108 and states (h) and (i) of FIG. 6).

Note that the control unit 108 can select the non-display setting data and cancel the non-display setting by taking into consideration not only the contact trajectory of the slide operation, but also data based on pressure during the slide operation. For example, when the data based on pressure during the slide operation is equal to or greater than the second threshold related to pressure and less than the third threshold related to pressure, the control unit 108 can cancel the non-display setting only for data belonging to the family group ("Ueki") and display this data (state (i) of FIG. 6).

Cancellation of the non-display setting is not limited to a slide operation to trace a predetermined trajectory. For example, after provision of the tactile sensation in step 5105, the control unit 108 can cause the display unit 103 to display an input screen for a password (security code) to cancel the non-display setting. Once the user inputs the password, the control unit 108 can determine whether the input password is correct. When the password is correct, the control unit 108 cancels the non-display setting.

After cancellation of the non-display setting, suppose the user releases the contacting object from the touch sensor 104 and then contacts the touch sensor 104 anew (states (j) and (k) of FIG. 6). When the touch sensor 104 detects new contact (step 5109: Yes), the control unit 108 can reset the non-display setting for the data for which the non-display setting was canceled (step S110 and state (l) of FIG. 6). Note that when the new contact satisfies a predetermined condition, the control unit 108 can also reset the non-display setting for the data for which the non-display setting was canceled. The predetermined condition may be a position condition (for example, whether the contact position is a predetermined position) or a pressure condition (for example, whether the data based on pressure is equal to or greater than a threshold related to pressure). When, for example, contact is made to data that was displayed by the non-display setting being canceled ("Ueki") (state (k) of FIG. 6), the control unit 108 can reset the non-display setting for the data for which the non-display setting was canceled.

The control unit 108 can also reset the non-display setting for the data for which the non-display setting was canceled when the user presses an application termination button (not illustrated) or the like, so that the address book application terminates, and the display unit 103 displays the standby screen.

In this way, in the present embodiment, the control unit 108 of the input device 101 controls the tactile sensation providing unit 107 to provide a tactile sensation to the contacting object in contact with the touch sensor 104 when data set to the non-display setting exists in correspondence with the display item. By simply contacting the touch sensor 104, the user can recognize the existence of non-display setting data based on whether a tactile sensation is provided. In other words, the user need not perform an operation such as canceling the non-display setting in order to recognize that non-display setting data exists. Hence, the user can easily recognize the existence of non-display setting data. Furthermore, the tactile sensation is only provided to the actual user pressing the touch sensor 104, so that even if a third-party is peeking at the touch panel 102, the existence of non-display setting data is not revealed to the third-party.

In the present embodiment, the control unit 108 can also control the tactile sensation providing unit 107 to provide a tactile sensation to the contacting object in contact with the touch sensor 104 when data set to the non-display setting exists in correspondence with the display item and data based on pressure on the touch sensor 104 is equal to or greater than a threshold related to pressure. In other words, the input device 101 need only execute the processing to provide a tactile sensation when the data based on pressure is equal to or greater than the threshold related to pressure and can provide the user with other processing when the data based on pressure is less than the threshold related to pressure. For example, in the address book application, when contact made to a displayed name is such that the data based on pressure is less than the threshold related to pressure, the control unit 108 can cause the display unit 103 to display detailed information on the name. In other words, by adjusting the pressure, the user can choose whether to perform an operation to confirm the existence of non-display setting data or to perform a different operation.

In the present embodiment, when a plurality of types of non-display settings exist (non-display setting for data belonging to the family group and non-display setting for data belonging to the friend group), the control unit 108 can also set a plurality of thresholds related to pressure (second and third thresholds related to pressure) in correspondence with the types of non-display settings. By understanding the relationship between the thresholds related to pressure and the types of non-display settings, the user can determine which data is set to the non-display setting based on the pressure when the tactile sensation is provided.

In the present embodiment, when the touch sensor 104 detects contact that satisfies a predetermined trajectory condition after the tactile sensation providing unit 107 provides the tactile sensation, the control unit 108 can also cancel the non-display setting of data set to the non-display setting and control the display unit 103 to display the data set to the non-display setting. In other words, by continuously performing a slide operation after a pressing operation to confirm the existence of non-display setting data, the user can cancel the non-display setting. Accordingly, the non-display setting can be canceled easily and without a superfluous operation.

In the present embodiment, when the touch sensor 104 detects contact after the non-display setting is canceled for data set to the non-display setting, the control unit 108 can also control the display unit 103 to resume non-display of the data for which the non-display setting was canceled. In other words, the user can reset the non-display setting by a simple operation of contacting the touch sensor 104.

In the present embodiment, when a plurality of pieces of data set to the non-display setting exists, the control unit 108 can also control the tactile sensation providing unit 107 to change the number of times a tactile sensation is provided in accordance with the number of pieces of data set to the non-display setting. In other words, the user can easily recognize the number of pieces of data set to the non-display setting based on the number of provided tactile sensations.

In the present embodiment, when the position of contact detected by the touch sensor 104 is a predetermined position, the control unit 108 can also control the tactile sensation providing unit 107 to provide a tactile sensation to the contacting object in contact with the touch sensor 104. In other words, a third party who is unaware of the predetermined position cannot confirm the existence of non-display setting data. Misuse by a third party can thus be prevented.

Although the present invention has been described by way of an embodiment with reference to the accompanying drawings, it is to be noted that various changes and modifications will be apparent to those skilled in the art. Therefore, such changes and modifications are to be understood as included within the scope of the present invention.

For example, the functions and the like included in the various members, units, steps, and the like may be reordered in any logically consistent way. Furthermore, units, steps, and the like may be combined into one or divided.

In the above description of an embodiment of the present invention, the control unit is described as determining whether data set to the non-display setting (non-display setting data) exists in correspondence with the current display item and as causing the tactile sensation providing unit to provide a tactile sensation in accordance with the result of determination. According to the present invention, however, the user can be provided with a tactile sensation in accordance with the presence of non-display setting data in a display item not currently being displayed. For example, when the current display item is "the A row of the address book", the tab for the A row (first identification information) is open, and other tabs, such as the tab for the Ka row (Ka/Ki/Ku/Ke/Ko) (second identification information), are closed. In other words, the data group for the A row (first data group) is displayed on the display unit 103. At this point, when the touch sensor detects contact to the tab for the Ka row, the control unit can determine whether the data group for the row corresponding to the second identification information (second data group) includes non-display setting data. When non-display setting data exists in the second data group, the control unit can control the tactile sensation providing unit to provide a tactile sensation to the contacting object in contact with the touch sensor. When non-display setting data does not exist in the second data group, the control unit can control the tactile sensation providing unit not to provide a tactile sensation to the contacting object in contact with the touch sensor. In this way, by contacting the identification information, the user can recognize whether non-display setting data exists in a display item not currently being displayed.

In the above description of an embodiment of the present invention, the display item has been described as "the A row of the address book", but the present invention can be applied to a display item in a different layer than the above display item. For example, suppose that when contact is made to a name (assumed hereinafter to be Aoyama) in "the A row of the address book", the detailed information for Aoyama is displayed. In other words, the display item "detailed information for Aoyama" is a layer below "the A row of the address book". When data set to the non-display setting exists in correspondence with the "detailed information for Aoyama", the control unit can provide a tactile sensation in accordance with contact by the user.

Figure 7:
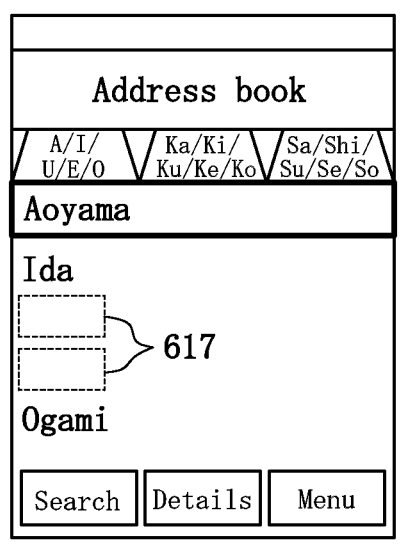
FIG. 7 is an example of a display screen of the display unit in an embodiment of the present invention.

In the above description of an embodiment of the present invention, a tactile sensation is described as being provided to allow the user to recognize the existence of non-display setting data, but the method of notifying the user is not limited to a tactile sensation. For example, suppose that in the address book application, the non-display setting is set for the data on two people in the A row. When the touch sensor is contacted in these circumstances, the control unit can cause the display unit to display the registered data for the A row while providing a gap 617 the size of two people, as shown in FIG. 7. As a result, the user can recognize that two pieces of non-display setting data exist.

In the above description of an embodiment of the present invention, the technical meaning of expressions such as, for example, "equal to or greater than" the threshold related to pressure or "less than" the threshold related to pressure is not necessarily precise. In accordance with the specifications of the input device, these expressions encompass the cases both of including and of not including the value representing the standard. For example, "equal to or greater than" the threshold related to pressure may refer not only to the case of the data based on pressure reaching the threshold related to pressure, but also the case of exceeding the threshold related to pressure. Furthermore, "less than" the threshold related to pressure, for example, may refer not only to the case of the data based on pressure falling below the threshold related to pressure, but also the case of reaching the threshold related to pressure, i.e. of being equal to or less than the threshold related to pressure.

The "display unit" and the "touch sensor" in the above description of an embodiment of the present invention may be configured as an integrated device by, for example, providing a common substrate with the functions of both the display unit and the touch sensor. An example of a device thus integrating the functions of both the display unit and the touch sensor is a liquid crystal panel having a matrix of pixel electrodes, with a plurality of photoelectric conversion elements, such as photodiodes, regularly mixed therein. This device receives touch input from a pen at a desired position on the panel display, and while displaying images with the liquid crystal panel structure, the device can detect the touch position by light from a backlight for liquid crystal display being reflected by the tip of the pen and received by surrounding photoelectric conversion elements.

REFERENCE SIGNS LIST

101: Input device
102: Touch panel
103: Display unit
104: Touch sensor
105: Memory unit
106: Pressure detection unit
107: Tactile sensation providing unit
108: Control unit
111: Tab
113, 115: Contact trajectory
617: Gap

The invention claimed is:

1. An input device, comprising:
a touch sensor configured to detect contact;
a tactile sensation providing unit configured to provide a tactile sensation to a contacting object in contact with the touch sensor;
a control unit configured to control the tactile sensation providing unit to provide the tactile sensation to the contacting object in contact with the touch sensor; and
a display unit that, under control of the control unit, displays a display item;
wherein in response to the contacting item coming in contact with a predetermined position of the touch sensor associated with the display item, the tactile sensation providing unit provides the tactile sensation to the contacting object when secret data corresponds with the display item, wherein
the secret data is data registered according to a secret setting based on a first action of a user, the secret setting being a non-display setting that causes the secret data to remain unseen until the secret setting is canceled based on a second action of the user that satisfies cancellation of the secret setting; and wherein after the tactile sensation providing unit provides the tactile sensation, when the touch sensor detects contact satisfying a predetermined trajectory condition, the control unit cancels secrecy for the data and controls the display unit to display the data.

2. The input device according to claim 1, further comprising a pressure detection unit configured to detect pressure on the touch sensor, wherein
when the secret data exists in correspondence with the display item, and data based on pressure on the touch sensor is equal to or greater than a threshold, the control unit controls the tactile sensation providing unit to provide the tactile sensation to the contacting object in contact with the touch sensor.

3. The input device according to claim 2, wherein the control unit sets a plurality of thresholds corresponding to the types of the secret data.

4. The input device according to claim 1, wherein when the touch sensor detects new contact satisfying a predetermined condition after the control unit cancels the secrecy for the data, the control unit sets the data in secret.

5. The input device according to claim 1, wherein when a plurality of the secret data exists, the control unit controls the tactile sensation providing unit to change a number of times the tactile sensation is provided to the contacting object in accordance with a number of the secret data.

6. The input device according to claim 1, wherein when a position of the contact detected by the touch sensor is the predetermined position, the control unit controls the tactile sensation providing unit to provide the tactile sensation to the contacting object in contact with the touch sensor.

7. The input device according to claim 1, wherein when a first data group including the secret data and a second data group not including the secret data exist, and first identification information corresponding to the first data group and second identification information corresponding to the second data group are displayed on the display unit, the control unit controls the tactile sensation providing unit to provide the tactile sensation to the contacting object in contact with the touch sensor when a position of the contact detected by the touch sensor is a position at which the first identification information is being displayed and not to provide the tactile sensation to the contacting object when the position of the contact is a position at which the second identification information is being displayed.

8. The input device according to claim 7, wherein when the first data group includes data and the touch sensor detects contact to the data, the control unit controls the display unit to display detailed information for the data.

\* \* \* \* \*